(12) United States Patent
Yamada et al.

(10) Patent No.: US 6,339,940 B1
(45) Date of Patent: Jan. 22, 2002

(54) SYNTHETIC QUARTZ GLASS MANUFACTURING PROCESS

(75) Inventors: Motoyuki Yamada; Hisatoshi Otsuka; Koji Matsuo, all of Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/553,392

(22) Filed: Apr. 20, 2000

(30) Foreign Application Priority Data

Apr. 21, 1999 (JP) ............................................. 11-113672

(51) Int. Cl.[7] .............................................. C03B 19/06
(52) U.S. Cl. ......................................... 65/17.4; 65/21.1
(58) Field of Search .................................. 65/17.4, 21.1

(56) References Cited

U.S. PATENT DOCUMENTS

| 4,432,781 A | * | 2/1984 | Okamoto et al. ............. 65/18.2 |
| 5,788,730 A | * | 8/1998 | Ruppert et al. ............... 65/17.4 |
| 6,018,964 A | * | 2/2000 | Yajima et al. .............. 65/29.12 |

FOREIGN PATENT DOCUMENTS

| EP | 231 022 | 8/1987 |
| EP | 861 812 | 9/1998 |
| GB | 2 134 896 | 8/1984 |
| WO | 00 23385 | 4/2000 |

OTHER PUBLICATIONS

Patent Abstracts of Japan vol. 12 No.462, (Dec. 5, 1988) & JP63 182227 (Jul. 27, 1988).
Patent Abstracts of Japan vol.1997 No.1, (Jan. 31, 1997) & JP 08 239230 (Sep. 17, 1996).
Patent Abstracts of Japan vol. 17 No.63, (Feb. 8, 1993) & JP 04 270133 (Sep. 25, 1992).
Patent Abstracts of Japan vol. 13 No.579, (Dec. 20, 1989) & JP 01 242431 (Sep. 27, 1989).
Patent Abstracts of Japan vol.1995 No.4, (May 31, 1995) & jp 07 025631 (Jan. 27, 1995).
Patent Abstracts of Japan vol.1996 No.10, (Oct. 31, 1996) & JP 08 165130 (Jun. 25, 1996).
Patent Abstracts of Japan vol. 1995 No.7, (Aug. 31, 1995) & JP07 109134 (Apr. 25, 1995).
Patent Abstracts of Japan vol. 18 No.92, (Feb. 15, 1994) & JP05 297235 (Nov. 12, 1993).

* cited by examiner

Primary Examiner—Christopher A. Fiorilla
(74) Attorney, Agent, or Firm—Millen, White, Zelano & Branigan, P.C.

(57) ABSTRACT

A process for manufacturing synthetic quartz glass involves feeding a quartz glass-forming raw material to a high-temperature gas zone within a chamber, converting the quartz glass-forming raw material into quartz soot, and forming synthetic quartz glass from the soot. A suspended soot-discharging gas which has been flow-straightened in a suspended soot discharging direction flows through the chamber in the vicinity of the high-temperature gas zone. This process keeps free suspended soot from settling onto the surface of the quartz ingot where fusion and growth take place, thereby preventing the formation of bubbles within the quartz glass under growth.

10 Claims, 2 Drawing Sheets

SYNTHETIC QUARTZ GLASS MANUFACTURING PROCESS

The present invention relates to a process for making bubble-free synthetic quartz glass.

BACKGROUND OF THE INVENTION

Quartz glass has excellent properties such as excellent transmittance to light having a broad range of wavelengths—from ultraviolet to infrared light, a very low thermal expansion coefficient and excellent heat and chemical resistance. Quartz glass is thus indispensable in a number of applications associated with very large scale integration (VLSI) chip fabrication, including wafer boats, furnace process tubes, deep-uv optics and mask substrates.

Known methods for manufacturing quartz glass include production by high-temperature vitrification and fusion using natural quartz as the raw material, a direct process involving the continuous production of a quartz glass ingot from a chemically synthesized silicon compound by high-temperature oxidation or hydrolysis, an indirect process wherein a chemically synthesized silicon compound is converted by high-temperature oxidation or hydrolysis into a very fine silicon dioxide aggregate known as "soot" which is subsequently vitrified, and a sol-gel process in which silica gel is prepared by a sol-gel reaction, then sintered and vitrified at an elevated temperature.

Quartz glass employed in optical elements and mask substrates is required to have optical uniformity and high light transmittance. Hence, use is primarily made of synthetic quartz glass manufactured by a direct or indirect process involving continuous production of a quartz glass ingot by the high-temperature oxidation or hydrolysis of a chemically synthesized silicon compound.

The direct process involves burning oxygen and hydrogen, for example, to produce a high-temperature flame, and heating a quartz ingot with the high-temperature flame. A silicon compound serving as the silicon source is introduced into the flame, converting the silicon to silicon dioxide, which is at the same time continuously deposited onto the surface of the ingot, thereby effecting synthetic quartz glass growth. In this process, the silicon raw material is oxidized or hydrolyzed in a high-temperature oxyhydrogen flame, yielding an extremely fine quartz material known as soot. This quartz is vitrified by the elevated temperature generated at the oxyhydrogen flame, following which it is deposited and fixed to the ingot, resulting in continuous growth of the ingot.

However, not all of the soot comes into contact with and deposits onto the ingot. Finely divided silicon oxide which does not contact and settle onto the region of growth on the ingot is discharged as free soot from the reaction and growth system, becoming suspended soot. Free soot coalesces inside and outside of the flame into larger-size material which may find its way back into the flame and settle on the regions of ingot fusion and growth. Because the soot is large in size, it does not fully melt in the ingot fusion region, and so ends up remaining as unfused areas. Such places become the starting point for bubble formation within the ingot. As ingot growth proceeds, the bubbles grow to an enormous size.

If heat-resistant substances such as mineral substances or metal dust are present in the atmosphere near the flame or near the ingot growth region, they are drawn into the flame or ingot fusion region and reach the ingot growth region, becoming foreign inclusions which trigger bubble formation and lower the homogeneity of the synthetic quartz glass. Because a large amount of such mineral substances, metal dusts and the like are present in air as dust and particulates, the synthetic quartz glass must be grown in an apparatus capable of providing a clean process atmosphere shut off from normal outside air. In a conventional arrangement typically adopted for this purpose, the synthetic quartz glass production apparatus is enclosed in a chamber, clean air obtained by passing outside air through a filter to remove dust and particulates is led into the chamber, and suspended coalesced soot which has not taken part in growth of the quartz glass is rapidly discharged outside of the reaction system.

However, in addition to the clean air mentioned above, there exist within the synthetic quartz glass production apparatus gas streams of differing velocities and directions, such as a high-speed oxyhydrogen flame gas stream and a hot gas stream from the burner. Turbulence by these streams causes some of the free suspended coalesced soot to settle on the inside walls of the apparatus near the growth region instead of being discharged outside the reaction and growth system. Moreover, turbulence of the gas streams and an increased amount of deposition cause this soot to be re-suspended so that it ultimately reaches the ingot fusion region, where it triggers bubble formation.

Problems of this type have not been limited only to the direct process described above, but have similarly arisen in other synthetic quartz glass production processes.

SUMMARY OF THE INVENTION

It is therefore an object of the present invention to provide a process for producing bubble-free synthetic quartz glass which is able to reliably discharge from the system suspended soot that has not been fixed as synthetic quartz, and can thus prevent the suspended soot from re-settling in the region of ingot growth.

We have discovered that if, in a synthetic quartz glass manufacturing process, a finely divided quartz soot-forming high-temperature gas zone within a synthetic quartz glass production chamber has a suspended soot-discharging gas passed therethrough in a state that is flow-straightened in the direction of suspended soot discharge, and if the flow-straightened gas is preferably passed through the high-temperature gas zone in a direction within preferably ±15 degrees of the direction of flow by a stream of high-temperature gas directed at the high-temperature gas zone, re-settling onto the ingot growth region of the suspended soot that has not been fixed as quartz can be prevented, making it possible to obtain bubble-free synthetic quartz glass.

Accordingly, the invention provides a process for manufacturing synthetic quartz glass comprising the steps of feeding a quartz glass-forming raw material to a high-temperature gas zone within a chamber, converting the quartz glass-forming raw material into quartz soot, forming synthetic quartz glass from the soot, and flowing a gas through the chamber in the vicinity of the high-temperature gas zone for discharging suspended soot in a direction, the discharging gas being flow-straightened in the suspended soot discharging direction.

Preferably, a stream of high-temperature gas flows through the high-temperature gas zone in a direction, and the flow-straightened suspended soot-discharging gas flows through the chamber in the vicinity of the high-temperature gas zone in a direction within ±15 degrees relative to the flow direction of the high-temperature gas stream.

BRIEF DESCRIPTION OF THE DRAWINGS

The objects, features and advantages of the invention will become more apparent from the following detailed description taken in conjunction with the accompanying drawings.

DETAILED DESCRIPTION OF THE INVENTION

Figure 1:
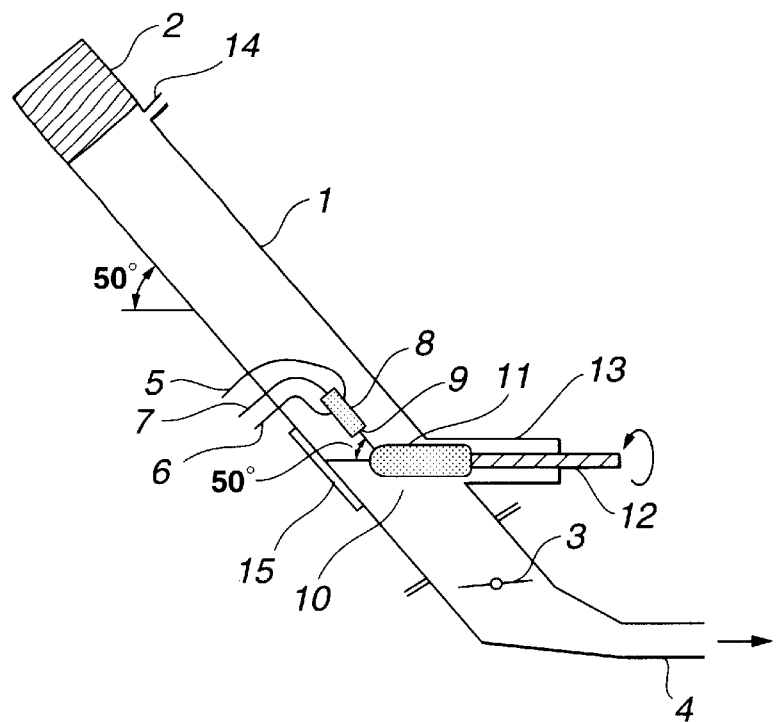
FIG. 1 is a schematic view of one exemplary apparatus for use in the practice of the invention.

In the synthetic quartz glass manufacturing process of the invention, a high-temperature gas supplied from a heating element such as a burner is passed through a chamber of cylindrical or other shape for synthetic quartz glass production, establishing a high-temperature gas zone. A quartz glass-forming raw material such as a silicon compound is fed to the high-temperature gas zone, thereby generating a fine quartz soot from which synthetic quartz glass is produced. The inventive method for manufacturing a synthetic quartz glass may be either a direct process or an indirect process. For example, in the case of synthetic quartz glass production by a direct process, a silicon compound such as a chlorosilane (e.g., silicon tetrachloride) or an alkoxysilane (e.g., tetramethoxysilane) is high-temperature oxidized or hydrolyzed in a high-temperature gas such as an oxyhydrogen flame or a plasma flame, yielding ultrafine silicon dioxide. The ultrafine silicon dioxide is subsequently vitrified by the high-temperature gas and deposited onto a quartz ingot, inducing growth of the ingot.

Preferably, the silicon compound serving as the raw material will have been highly purified by distillation, in which case high-purity synthetic quartz glass can be manufactured.

In regard to the high-temperature gas stream, the gases that are used to form the oxyhydrogen flame are oxygen gas and hydrogen gas, and argon gas is typically used for plasma applications. These gases can be used after high purification using a conventional method.

The oxyhydrogen flame, which is a high-temperature gas stream that serves here as one heating source for holding the quartz ingot at a high temperature, has a theoretical combustion flame temperature of 2800° C. Although this temperature is very high, a considerable amount of hydrogen and oxygen must be supplied to maintain the surface temperature required for ingot growth because the flame itself has a low heat capacity and the amount of heat radiation by the ingot is quite large. To maintain the ingot at a temperature enabling continuous growth, combustion gases from the burner form a high-velocity stream having a flow rate of generally from 5 to 20 Nm/s, and preferably from 8 to 15 Nm/s. When the high-velocity stream impinges on the ingot, the stream changes its direction, disrupting the surrounding flow of gases. Also, because the free soot that has not taken part in ingot growth remains present in the atmosphere together with the stream of exhaust gases, the high-velocity stream of combustion gases causes the suspended soot to re-deposit on interior surfaces of the chamber.

Moreover, due to the high temperature of the oxyhydrogen flame and the ingot, ascending streams of gas form locally within the ingot growing chamber. As a result, deposition of the suspended soot takes place not only downstream from the flame, but also within the chamber walls located upstream from the burner. The soot that has settled on the upstream side is re-suspended by gas stream turbulence as described above, and has a high probability of settling in the ingot growth region, where it becomes a cause of bubble formation.

To resolve the problems caused by such suspended soot and free soot, the synthetic quartz glass manufacturing process of the invention passes through the chamber and in the vicinity of the high-temperature gas zone a suspended soot-discharging gas that has been flow-straightened in a suspended soot discharging direction. When the soot-discharging gas is passed through the interior of the chamber, it starts to flow from an area upstream of where the high-temperature gas forms and its flow is straightened at a point upstream of where the high-temperature gas forms. Then the soot-discharging gas can be rendered into a forward-moving stream from the region of high-temperature gas formation to the high-temperature gas zone. This has the effect of minimizing gas stream turbulence in the high-temperature gas zone (i.e., in the vicinity of the high-temperature reaction region and the glass growing region). As a result, even should some settling of suspended soot occur, this happens only downstream from the flame, thus making it possible to achieve ingot growth without allowing bubbles to form.

The gas which is flow-straightened in the invention serves to carry away suspended soot. Suitable examples include gases that do not directly interfere with conversion of the silicon compound to silicon dioxide, such as air, argon and nitrogen. Air is preferred for economic reasons.

The flow-straightened gas is passed downstream in a flow-straightened state to the high-temperature gas forming region, and thus flows through the chamber in the vicinity of the high-temperature gas zone (i.e., the high-temperature reaction region and the glass growing region). While the path of the flow-straightened gas passing through positions near the high-temperature gas can bend as if drawn toward the high-velocity, high-temperature gas, the flow-straightened gas which flows through positions further away from the high-temperature gas zone passes by the high-temperature gas zone without bending in its path.

If there exists in the flow of gases near the high-temperature gas forming region a state of unstraightened flow wherein eddies and swells arise, turbulence in the flow of gases is further increased by the stream of high-temperature gas. As a result, it is likely that some of the free suspended soot will be carried back by such turbulence and settle in the upper portion of the chamber. Even if the amount of such settling is very small, a long term of continuous operation for the production of synthetic quartz glass gradually increases the amount of soot deposited. Some of this soot is eventually dislodged by the flow of gases and reaches the ingot, where it becomes a cause of bubble formation. The invention avoids such undesirable effects by passing a flow-straightened gas stream through the chamber as described above. "Flow-straightened gas stream" is used herein to refer to a gas stream free of macroscopic changes in flow such as eddies and swells. The present invention does not address microscopic changes in flow of the type typified by Reynolds number.

More specifically, "flow-straightened gas stream" refers to a gas stream which, when microparticles serving as flow markers in the stream (e.g., titanium oxide having a particle size of several microns or incense smoke) are entrained by the flow, presents a visible flow pattern free of eddies or other abrupt changes in the streamlines, and which does not form a counterflow having an angular difference of more than 90 degrees with the main flow direction vector of the gas stream. Hence, the method just described can be used to ascertain whether the stream of soot-discharging gas is in the flow-straightened state of the invention.

Illustrative, non-limiting examples of methods that may be used in the invention to provide a flow-straightened, forward-moving stream of the soot-discharging gas upstream from the high-temperature gas-forming region include flow rectification by making the linear flow path of gas sufficiently long, providing a gas flow path construction in which the cross-sectional surface area of the chamber duct gradually widens outward at a gently tapered angle, and flow straightening by disposing a flow straightener within the gas duct. Effective use may be made of these or any other method for providing a forward-moving flow of gases, although the particular method used should be selected in accordance with the dimensions and construction of the chamber.

To smoothly discharge the free suspended soot present in the exhaust gas downstream of the high-temperature gas zone, it is most advantageous for the direction of flow by the soot-discharging gas to be the same as the angle at which the high-temperature gas stream impinges on the ingot. The difference in angle is preferably within a range of ±15 degrees, more preferably within a range of ±10 degrees, and most preferably within a range of ±5 degrees. At an angular difference outside of the foregoing range, turbulence in the flow of the soot-discharging gas near the high-temperature gas stream cannot be held in check, making it impossible to have the soot-discharging gas pass through in the forward direction. As a result, bubbles may form during growth of the synthetic quartz glass.

The angle at which the high-temperature gas stream impinges upon the ingot relative to the axial direction of the ingot is preferably within a range of 0 to 70°, and more preferably within a range of 0 to 600. The velocity of the soot-discharging gas can be suitably adjusted according to the apparatus, but is generally within a range of 0.3 to 5 Nm/s, and preferably from 0.5 to 2 Nm/s. A soot-discharging gas velocity of less than 0.3 Nm/s may allow the soot-discharging gas to be affected by the high-temperature gas or an ascending gas stream generated by the high temperature of the ingot, possibly resulting in the deposition of free soot directly above the ingot or in an area upstream of the high-temperature gas-forming region. On the other hand, at a soot-discharging gas velocity greater than 5 Nm/s, macroscopic turbulence may arise in the gas flow.

Figure 2:
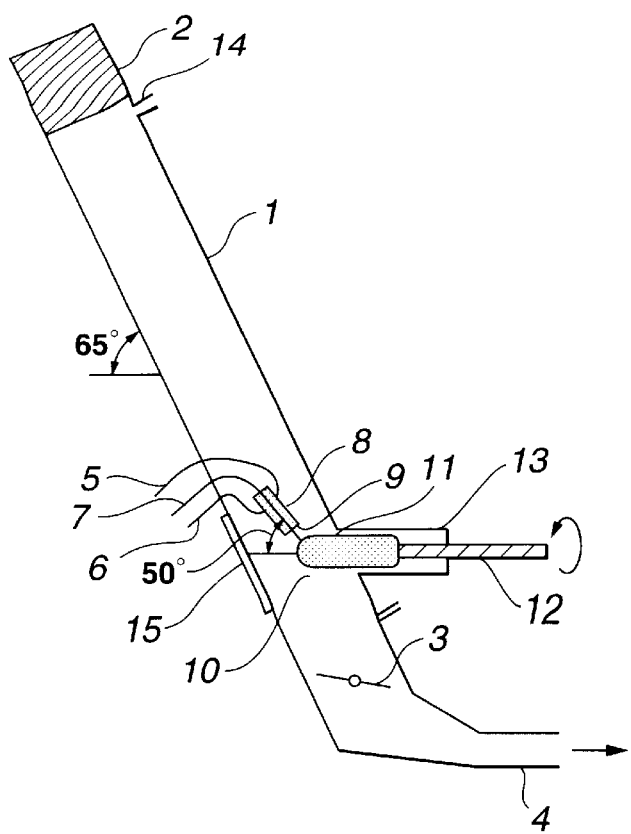
FIG. 2 is a schematic view of another exemplary apparatus for use in the practice of the invention.

Referring to FIGS. 1 and 2, there are illustrated examples of synthetic quartz glass producing apparatus that may be used in the practice of the invention. The apparatus includes a cylindrical chamber 1 which is inclined at a predetermined angle to the horizontal. The angle is 50° in FIG. 1, and 65° in FIG. 2. The chamber 1 contains a filter 2 mounted at the top end thereof and a damper 3 situated near the bottom. The bottom end of the chamber 1 is connected to a line 4 which enables forced exhaust with a blower (not shown). The chamber 1 also has a hydrogen inlet 5, an oxygen inlet 6, an inlet 7 for a quartz glass raw material such as silicon tetrachloride, and a heating source in the form of a burner 8 to which the inlets are coupled. The location of the burner 8 serves as a high-temperature gas generating region 9, downstream from which there is formed a high-temperature gas zone 10. The front end of a quartz ingot 11 having a front end and a base end is horizontally inserted into the high-temperature gas zone 10. The base end of the ingot 11 is coupled to a shaft 12 having a front end and a base end. The base end of the ingot 11 and the front end of the shaft 12 are held airtightly within a tubular housing 13. The base end of the shaft 12 passes airtightly through an end wall of the housing 13 and projects outside thereof. The projecting base end of the shaft 12 is connected to a rotating mechanism (not shown) which is driven so as to rotate the shaft 12, and thus the ingot 11.

In the apparatus shown in FIG. 1, the burner 8 is w oriented in the axial direction of the chamber 1. As a result, high-temperature gases from the burner 8 are emitted in the axial direction of the chamber 1 toward the high-temperature gas zone 10, and thus supplied at an inclination of 500 to the axial direction (horizontal direction) of the ingot 11. In the apparatus having a chamber angle of 65° shown in FIG. 2, the burner 8 is disposed at an angle of 15° to the axial direction of the chamber 1, and so here too is oriented at an angle of 50° to the axial direction of the ingot 11.

In the apparatus shown in FIGS. 1 and 2, the filter 2 and the burner 8 are positioned sufficiently far from one another to allow air from which microparticles have been removed by passage through the filter 2 to be flow-straightened. The flow-straightened air passes axially through the chamber 1, moving from the high-temperature gas-generating region 9 to the high-temperature gas zone 10. Accordingly, in the apparatus of FIG. 1, the high-temperature gases from the burner 8 and the flow-straightened air flow in the same direction, whereas in the apparatus of FIG. 2, the straightened air flows at an angle of 15° to the direction of flow by the high-temperature gases from the burner 8.

In the production of synthetic quartz glass using the foregoing apparatus, hydrogen and oxygen are fed to the burner 8, forming a high-temperature gas zone 10. A synthetic quartz glass raw material gas such as silicon tetrachloride is supplied to the high-temperature gas zone 10 and converted into a fine quartz soot, which is then deposited on the ingot 11. Since flow-straightened air flows from the high-temperature gas-generating region 9 to the high-temperature gas zone 10 according to the invention, suspended soot which has not deposited onto the ingot 11 is reliably discharged to the exterior from the bottom of the chamber 1 by the flow-straightened air. This discourages the formation of disorderly gas flow such as eddies in the high-temperature gas zone 10, thereby preventing the deposition of suspended soot on the upstream side of the ingot 11 and making it possible to obtain bubble-free synthetic quartz glass.

The diagrams additionally show a nozzle 14 for introducing titanium oxide so as to determine the flow-straightness of the air, and a sight glass 15.

EXAMPLE

Examples of the invention and comparative examples are given below by way of illustration, and are not intended to limit the invention.

Example 1

Synthetic quartz glass was produced using the apparatus shown in FIG. 1. A cylindrical chamber having an inside diameter of 80 cm and a length of 5 m was placed at an angle of 50° to the horizontal, thereby setting the difference in angle between the high-temperature gas stream and the flow-straightened gas at 0°. A filter was mounted at one end of the cylindrical chamber, and a line capable of forced exhaust with a blower was connected to the other end with a damper therebetween. The burner was situated on the centerline of the cylinder at a position 4 m from the filter, and the burner mounting angle was, like the chamber, set at 50° to the horizontal. The quartz ingot was placed horizontally so as to enter the cylinder at a position 4.3 m from the filter. The ingot was fixed at its base end to a rotatable shaft having a seal construction that enables the interior of the chamber to be shut off from outside air. A nozzle for introducing titanium oxide powder into air was provided on the cylindrical chamber near the filter so that titanium oxide powder-carrying air might flow through the chamber, and a sight glass was positioned near the burner and ingot to enable observation of the chamber interior.

Hydrogen (40 m³/h) and oxygen (20 m³/h) were fed to the burner to form a flame, with which the ingot was heated. The damper was adjusted to set the gas velocity within the chamber at an average linear velocity of 1 Nm/s, following which titanium oxide was introduced into the chamber. Observation through the sight glass showed that turbulence did not arise although some bending of the flow lines occurred near the sides of the burner.

Synthetic quartz glass was grown in this state by feeding 3,000 g/h of silicon tetrachloride to the burner. During 240 hours of synthetic quartz glass growth, no bubble formation was observed in the quartz glass. The deposition of suspended soot on the inside walls of the chamber took place only on the downstream side of the ingot. No such deposition was observed upstream of the ingot.

Example 2

As shown in FIG. 2, the cylindrical chamber was set an angle of 65° to the horizontal, thereby creating an angular difference of 15° between the high-temperature gas stream and the flow-straightened air. The burner was placed on the centerline of the cylinder at a position 4 m from the filter, and the burner mounting angle was set at 50° to the horizontal, as in Example 1. Gas flow observation was carried out under conditions that were otherwise identical to those in Example 1. As in Example 1, stream turbulence did not arise within the chamber. Synthetic quartz glass was grown in this state by feeding 3,000 g/h of silicon tetrachloride to the burner. During 240 hours of synthetic quartz glass growth, no bubble formation occurred in the quartz glass. Moreover, the deposition of suspended soot on the inside walls of the chamber took place only on the downstream side of the ingot. Deposition above the ingot was not observed.

Example 3

Gas flow observation was carried out under the same conditions as in Example 1, except that the burner angle of inclination to the ingot was set at 50° and the angle of the cylindrical chamber to the horizontal was varied as shown in Table 1 below. Synthetic quartz glass was grown in this state by feeding 3,000 g/h of silicon tetrachloride to the burner. The results are given in the table.

TABLE 1

| Chamber inclination to the horizontal | Gas flow | Number of bubbles (240 hours) | Site of suspended soot deposition | Remarks |
| --- | --- | --- | --- | --- |
| 35 | Forward | 0 | Below ingot top | |
| 40 | Forward | 0 | Below ingot side | |
| 45 | Forward | 0 | Below ingot side | |
| 50 | Forward | 0 | Below ingot side | Example 1 |
| 55 | Forward | 0 | Below ingot side | |
| 60 | Forward | 0 | Below ingot side | |
| 65 | Forward | 0 | Below ingot side | Example 2 |

Comparative Example 1

Figure 3:
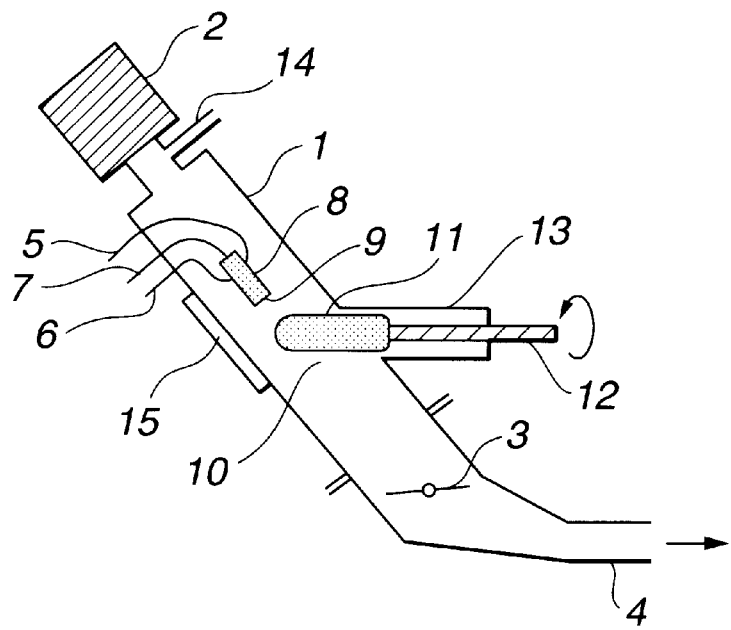
FIG. 3 is a schematic view of the apparatus used in Comparative Example 1.

Referring to FIG. 3, the cylindrical chamber in Example 1 was cut at a point 50 cm above the burner, and capped with a flange having a 30 cm inside diameter nozzle. The filter was mounted on top of the nozzle, and another nozzle for introducing titanium oxide like that in Example 1 was mounted directly below the filter.

Oxygen and hydrogen were fed to the burner under the same conditions as in Example 1. The same amount of air as in Example 1 was passed through the chamber and the flow pattern was observed using titanium oxide. Considerable disruption of the gas stream was noted at the top and sides of the burner.

Synthetic quartz glass was grown in this state by feeding 3,000 g/h of silicon tetrachloride to the burner. During 240 hours of synthetic quartz glass growth, the formation of seven bubbles was observed. The deposition of suspended soot on the inside walls of the chamber took place downstream from a point 40 cm above the ingot.

Comparative Example 2

Figure 4:
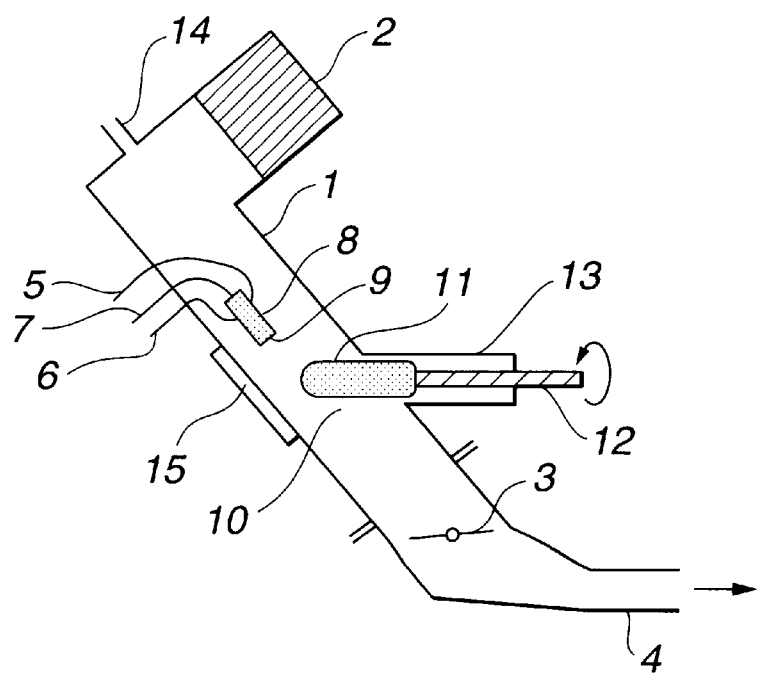
FIG. 4 is a schematic view of the apparatus used in Comparative Example 2.

Referring to FIG. 4, the cylindrical chamber in Example 1 was cut at a point 1 meter above the burner and modified so as to allow air to enter the chamber from the top after passing through a filter. A cap equipped with a titanium oxide-introducing nozzle was placed over the cut end of the chamber.

Oxygen and hydrogen were fed to the burner under the same conditions as in Example 1. Air having an average flow rate of 1 Nm/s was passed through the chamber and the flow pattern was observed using titanium oxide. Large, vertical turbulences were observed in the chamber at the top and sides of the burner.

Synthetic quartz glass was grown in this state by feeding 3,000 g/h of silicon tetrachloride to the burner. During 240 hours of synthetic quartz glass growth, the formation of 12 bubbles was observed. Suspended soot deposition took place over the entire area of the cylindrical chamber above the burner.

The synthetic quartz glass manufacturing process of the invention is able to keep free suspended soot from settling onto the surface of the quartz ingot where fusion and growth takes place, and prevent the formation of bubbles within the quartz glass under growth.

Japanese Patent Application No. 11-113672 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for manufacturing synthetic quartz glass comprising the steps of:
   - feeding a quartz glass-forming raw material to a high-temperature gas zone within a chamber,
   - converting the quartz glass-forming raw material into quartz soot,
   - forming synthetic quartz glass from the soot, and
   - flowing a gas through the chamber in the vicinity of the high-temperature gas zone for discharging suspended soot in a direction, the discharging gas being flow-straightened in the suspended soot discharging direction,
     - wherein a stream of high-temperature gas flows through the high-temperature gas zone in a direction, the angle at which the high-temperature gas stream impinges upon an ingot relative to the axial direction of the ingot is within 0–70 degrees, and the flow-straightened suspended soot-discharging gas flows through the chamber in the vicinity of the high-temperature gas zone in a direction within 15 degrees relative to the flow direction of the high-temperature gas stream.

2. A process according to claim 1, wherein said high-temperature gas zone is formed by discharging high-temperature combustion gases from a burner to form a high-velocity stream having a flow rate of 5–20 Nm/s.

3. A processing according to claim 2, wherein said high-velocity stream has a flow rate of 8–15 Nm/s.

4. A process according to claim 1, wherein said gas which flows through the chamber in the vicinity of the high-temperature gas zone is air, argon or nitrogen.

5. A process according to claim 1, wherein the angle at which the high-temperature gas stream impinges upon an ingot relative to the axial direction of the ingot is 0–60 degrees.

6. A process according to claim 1, wherein the flow-straightened suspended soot-discharging gas has a velocity of 0.3–5 Nm/s.

7. A process according to claim 1, wherein the flow-straightened suspended soot-discharging gas has a velocity of 0.5–2 Nm/s.

8. A process according to claim 1, wherein the difference in angle between the direction of the soot-discharging gas and the direction of the high-temperature gas stream is 10 degrees.

9. A process according to claim 1, wherein the difference in angle between the direction of the soot-discharge gas and the direction of the high-temperature gas stream is 5 degrees.

10. A process for manufacturing synthetic quartz comprising:
    - feeding fuel and quartz-glass-forming raw material to a burner within a chamber to form a gas zone containing combustion gases and quartz soot,
    - depositing quartz soot onto a quartz ingot thereby inducing growth of the ingot, and
    - flowing a soot suspending/soot discharging gas through the gas zone to discharge suspended soot in a direction away from said gas zone,
      - wherein said soot suspending/soot discharging gas is flow-straightened,
      - wherein said soot suspending/soot discharging gas passes through said gas zone in a direction which is 15 degrees with respect to the direction of combustion gases from said burner thereby inhibiting resettling of suspended soot that has not been fixed as quartz onto the ingot, and
      - wherein the angle at which the combustion gases impinge upon the ingot relative to the axial direction of the ingot is 0–70 degrees.

* * * * *